United States Patent
Wellbrock et al.

(10) Patent No.: US 8,391,707 B2
(45) Date of Patent: Mar. 5, 2013

(54) MAINTENANCE FRIENDLY OPTICAL FIBER SWITCHING SYSTEM

(75) Inventors: Glenn A Wellbrock, Wylie, TX (US); Tiejun J Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 584 days.

(21) Appl. No.: 12/618,331

(22) Filed: Nov. 13, 2009

(65) Prior Publication Data

US 2011/0116789 A1  May 19, 2011

(51) Int. Cl.
   *G02F 1/00* (2006.01)
(52) U.S. Cl. ........... 398/5; 398/2; 398/3; 398/4; 398/45; 398/16; 398/33; 398/177; 385/24; 385/16; 385/17; 385/18; 370/216; 370/217; 370/218; 370/227; 370/228; 370/225; 370/238
(58) Field of Classification Search ................... 398/2, 3, 398/4, 5, 7, 8, 45, 48, 50, 16, 33, 34, 177, 398/56, 158, 159, 53, 54, 55, 25, 26, 27, 398/28, 29, 38, 30, 31, 32, 135, 136, 141, 398/81, 79, 59, 83; 385/24, 16, 17, 18; 370/216, 370/217, 218, 221, 222, 223, 225, 227, 228, 370/389, 352, 392, 535, 235, 238, 242
See application file for complete search history.

(56) References Cited

U.S. PATENT DOCUMENTS 5,069,521 A * 12/1991 Hardwick .................... 385/24
8,027,585 B2 * 9/2011 Yokoyama ................... 398/50
8,077,385 B2   12/2011 Yang et al.
2008/0175587 A1 * 7/2008 Jensen ........................ 398/2
2010/0027989 A1 * 2/2010 Lewis et al. ................ 398/2

OTHER PUBLICATIONS

Calient Networks, Inc., "Flexible Fiber Optic Cross-Connection Management", http://www.calient.com/applications/in_the_co.php, 3 pages, Nov. 16, 2009 (print date).
Glimmerglass Networks, Inc., "Intelligent Optical Switches", www.glimmerglass.com, 2 pages, Nov. 16, 2009 (print date).
CrossFiber, Inc., "Optical Switch Modules", http://www.crossfiber.com/products/index.html, 1 page, Nov. 16, 2009 (print date).
Polatis, "Optical Switch Products", http://www.polatis.com/products/index.asp, 2 pages, Nov.16, 2009 (print date).
IEC, Webstore International Electrotechnical Commission, "Safety of Laser Products—Part 2: Safety of Optical Fibre Communication Systems (OFCS)", http://webstore.iec.ch/webstore/webstore.nsf/artnum/032503, Jun. 28, 2004, Abstract.

* cited by examiner

*Primary Examiner* — Hanh Phan

(57) ABSTRACT

First and second switching device are connected by a number of signal paths. The first switching device receives an instruction to switch from a first one of the signal paths to a second one of the signal paths. The first switching device performs, in response to the received instruction, a first switching operation to connect the first path, at an input of the first switching device, to the second path, at an output of the first switching device. The second switching device receives the instruction to switch from the first path to the second path and detects a loss of signal on the first path as a result of the first switching operation performed by the first switching device. The second device performs, in response to detecting the loss of signal on the first path, a second switching operation to connect the first path, at an output of the second switching device, to the second path, at an input of the second switching device.

20 Claims, 8 Drawing Sheets

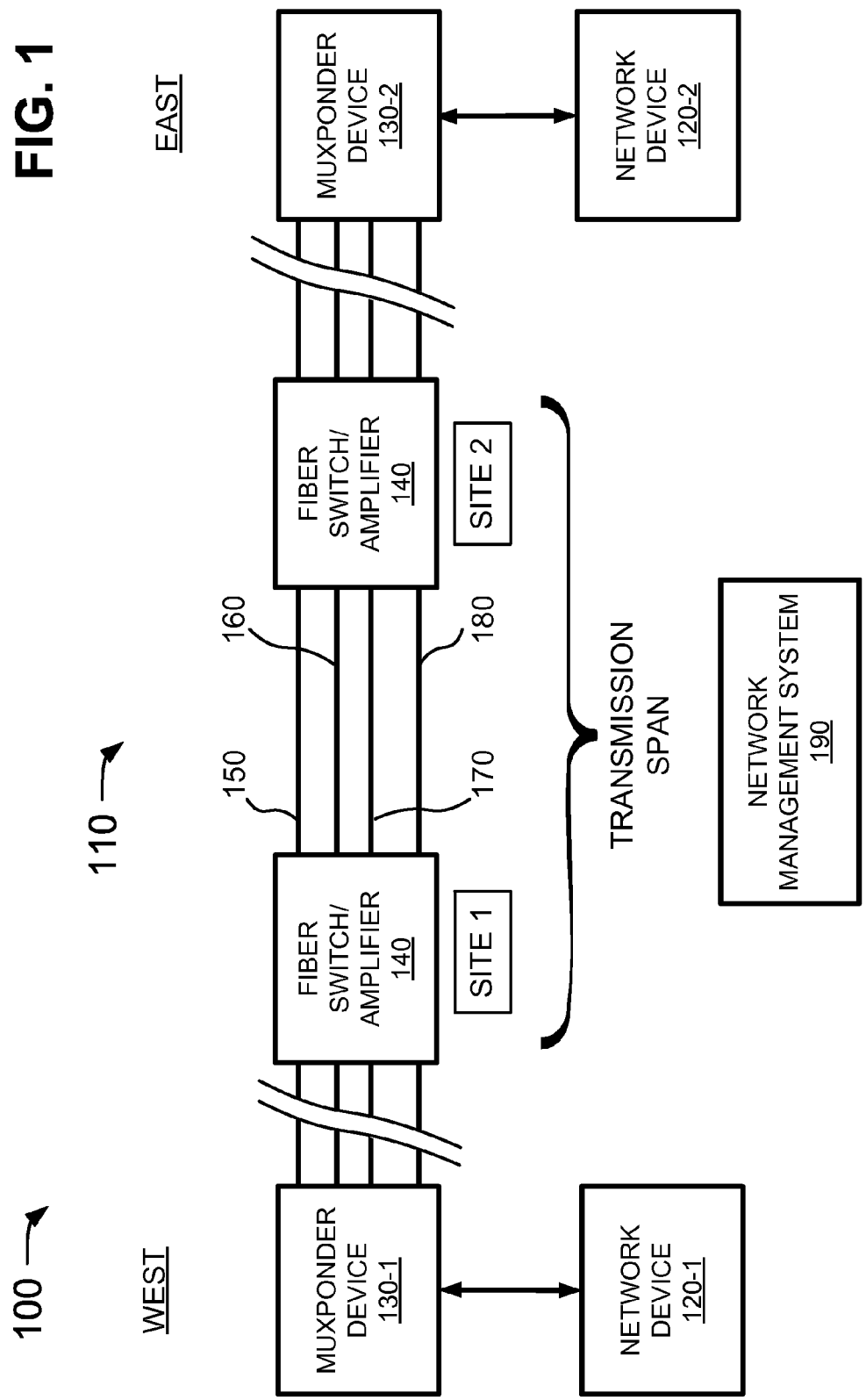

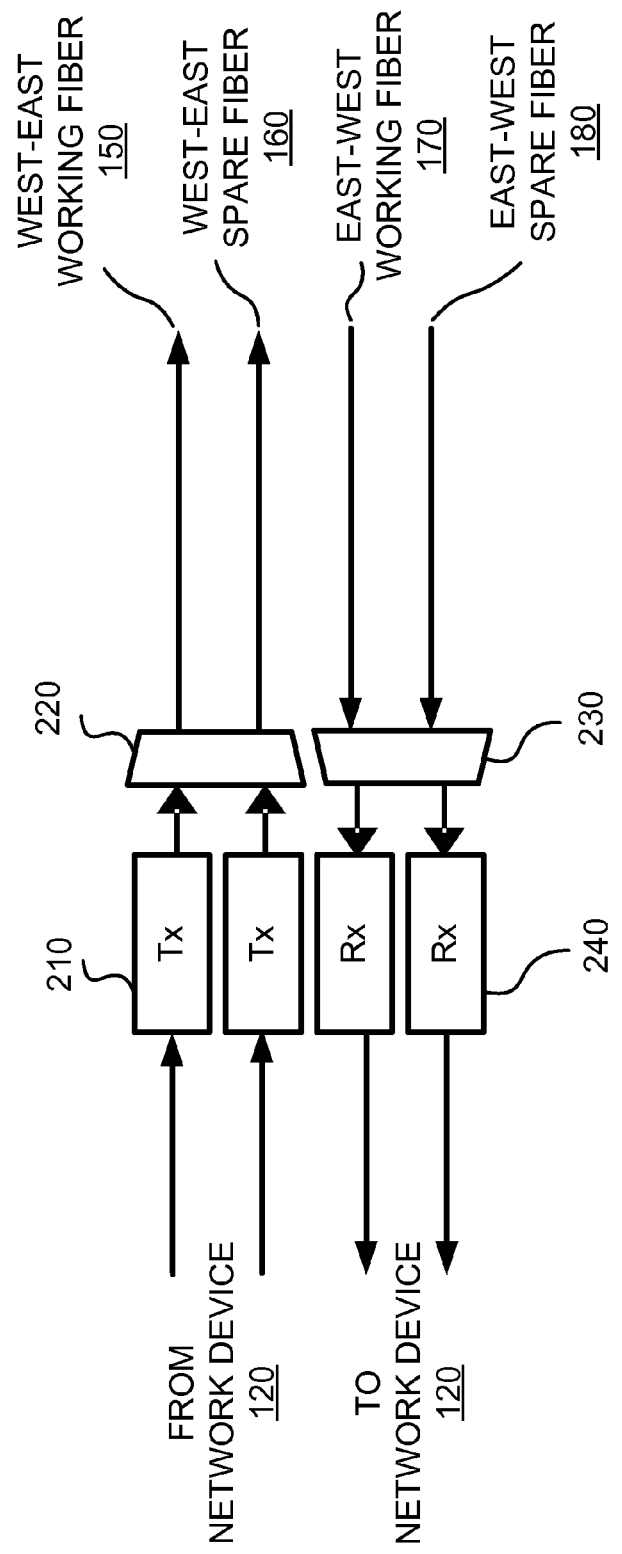

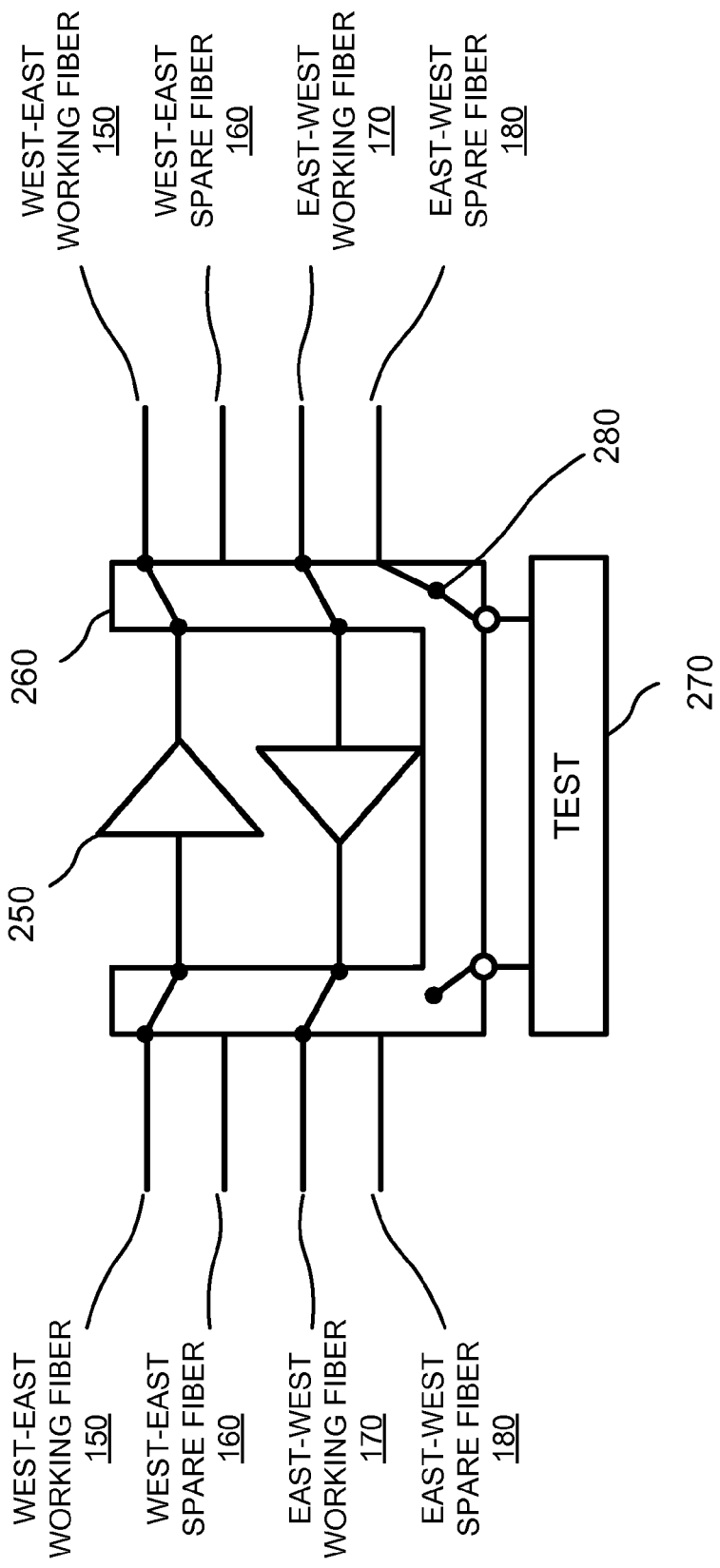

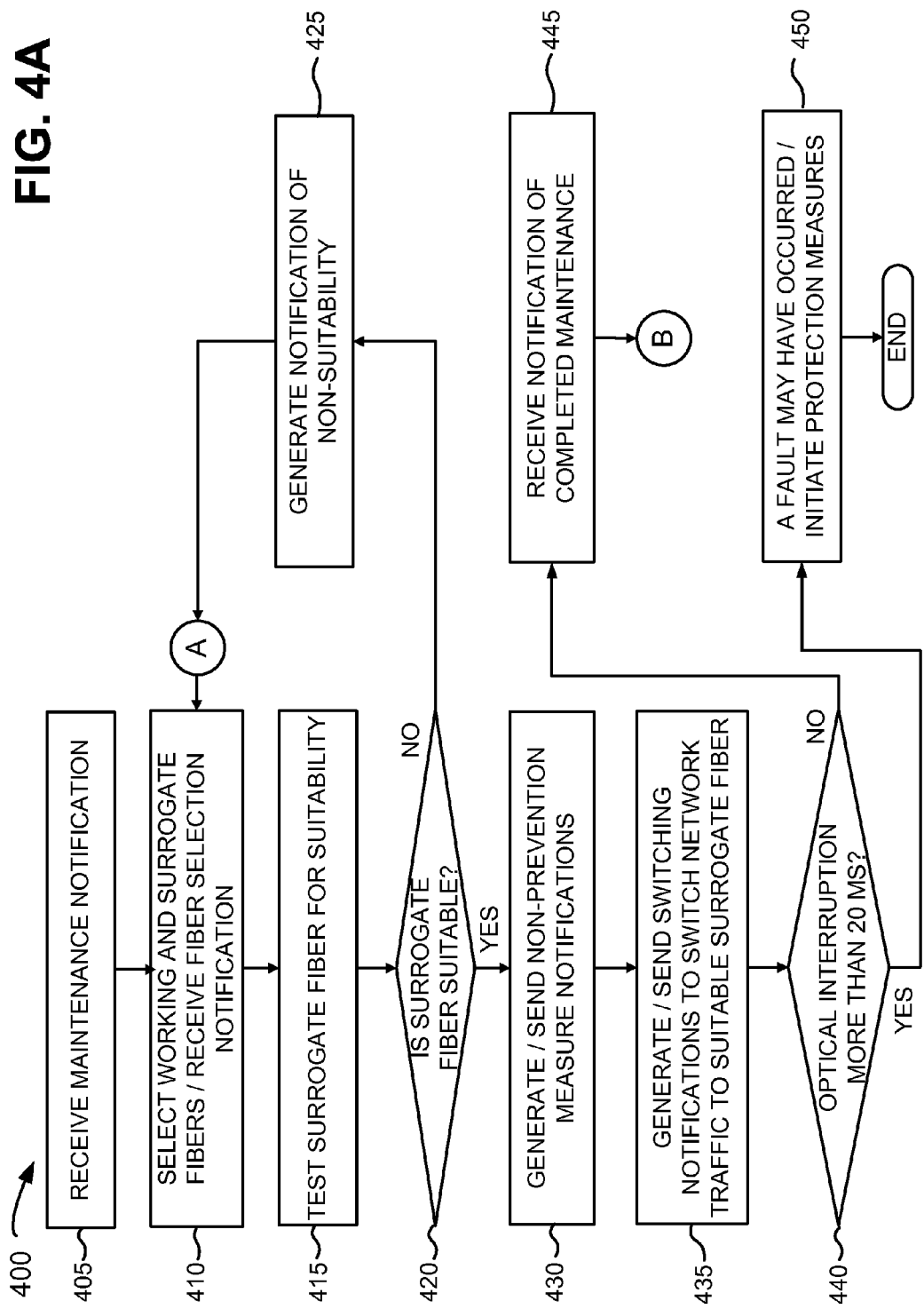

MAINTENANCE FRIENDLY OPTICAL FIBER SWITCHING SYSTEM

BACKGROUND

Optical cables are used for high-speed communication and data transmission over short distances, such as for a local area network within a metropolitan area, as well as long distances, such as for a long haul optical network. Short and long distance optical networks occasionally suffer interruptions in network traffic due to faults in one or more optical cables due to a variety of reasons. For example, optical cables may be cut by accident (e.g., due to construction) or as part of a planned maintenance event, such as rerouting cables around a construction site; aged optical cables may degrade resulting in reduced transmissivity of the optical fiber material, causing the optical signal to prematurely weaken as it travels through the fiber and/or cable; and kinks in an optical cable can diminish or interrupt optical signals.

Traditionally, when a fault is detected, the signal on the working fiber, which may include tens or hundreds of channels that carry network traffic, may be rerouted to an alternate path, such as a protection path, which may enable the optical network to continue to operate while minimizing downtime or disruption of network client services. Similarly, during maintenance actions, a protection path may also be utilized to reroute optical signals to ensure that network traffic continues to flow to its intended destination while minimizing network down time or interruption.

However, while protection paths may, in some circumstances, reduce network downtime or disruption, utilizing a protection path while performing maintenance operations may nonetheless introduce new operational risks and/or undesirable affects on network operations, client services and operational costs. For example, utilizing a protection path, particularly during planned maintenance operations, may introduce constraints into the optical network that may affect performance, such as loss of optical path diversity (e.g., loss of link diversity and/or node diversity) due to the restriction in the number of available signal paths, which may also reduce available bandwidth for network traffic. Utilization of protection paths may also increase the likelihood of dual events (e.g., dual faults) due to the loss or reduction in available or redundant optical paths, which may increase the risk of network operations and/or reduced optical network reliability or performance. Additionally, normal fiber maintenance using protection paths may be both costly and disruptive to network operations due to the need to schedule and coordinate maintenance events well in advance to minimize impact on network services (e.g., due to shut downs on portions of the optical network); to inform and coordinate potential disruption of network services to clients; and to synchronize network maintenance crew schedules with those of local authorities and/or crews associated with sites (e.g., construction sites, locations of natural disasters, etc.) where maintenance may be performed.

BRIEF DESCRIPTION OF THE DRAWINGS

FIG. 1 is a block diagram of an exemplary optical network in which systems and/or methods described herein may be implemented;

FIG. 2A is a diagram of exemplary components of a muxponder device of FIG. 1;

FIG. 2B is a diagram of exemplary components of a fiber switch/amplifier device of FIG. 1;

FIGS. 4A and 4B are flowcharts of an exemplary fiber switching maintenance process for the optical network of FIG. 1;

DETAILED DESCRIPTION OF PREFERRED EMBODIMENTS

Figure 3:
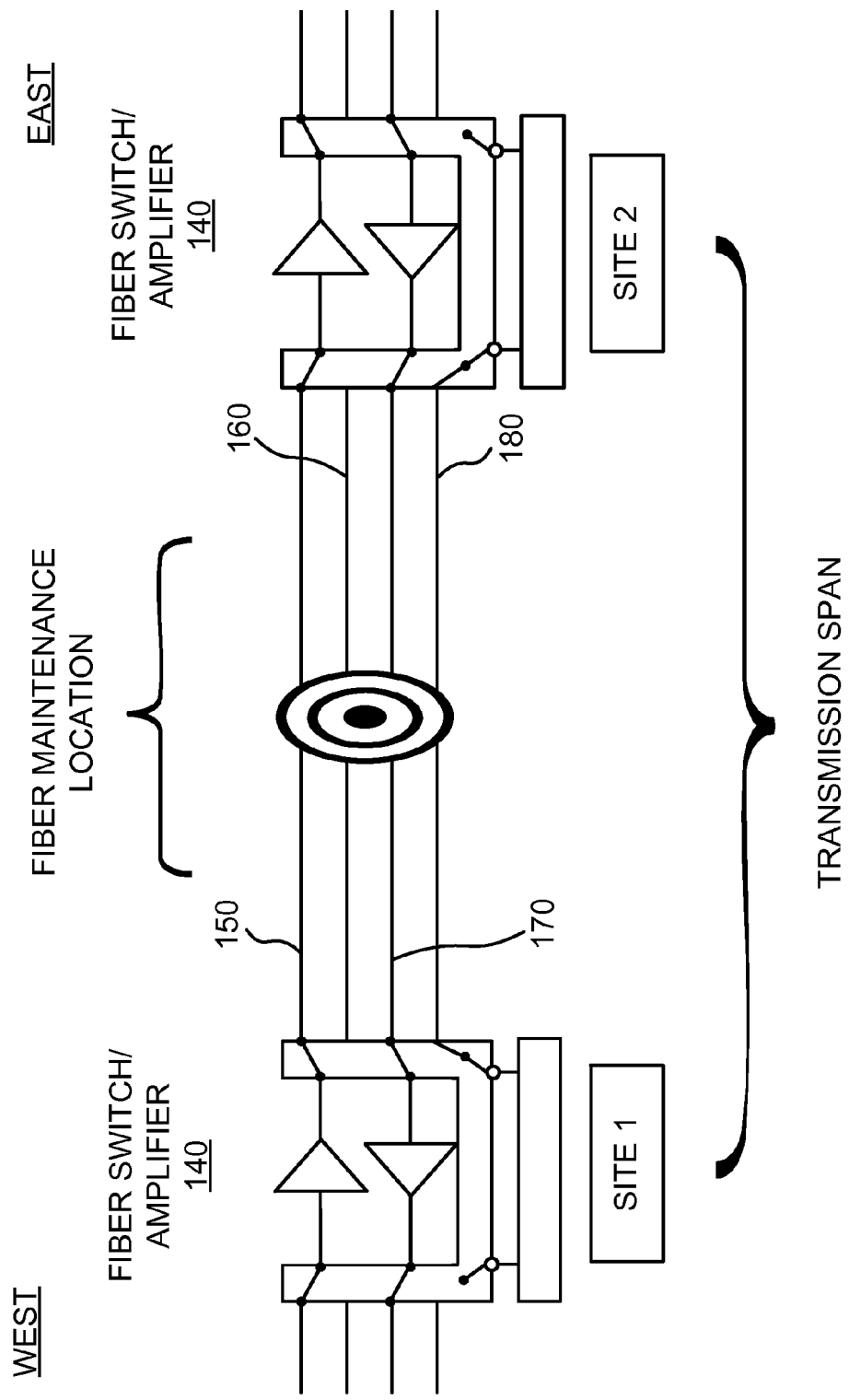
FIG. 3 is a diagram of an exemplary transmission span of the optical network of FIG. 1.

The following detailed description refers to the accompanying drawings. The same reference numbers in different drawings may identify the same or similar elements. Also, the following detailed description does not limit the invention.

Implementations described herein may provide an optical fiber switching maintenance system (hereinafter referred to as "fiber switching") that may enable planned optical network maintenance operations without resorting to a protection path. In one implementation, fiber switching may enable switching an optical signal between two or more optical fibers, where at least part of the fiber switching is triggered based on a loss of optical signal. Accordingly, the fiber switching may occur quickly, such as within a time period of approximately 20 ms or less. Fiber switching may enable optical network maintenance and/or optical signal rerouting of one or more optical cables and/or optical fibers within optical cables, using fiber switching maintenance techniques described herein, which may reduce or eliminate the need to establish one or more protection paths in order to perform the maintenance.

By utilizing fiber switching, network traffic (e.g., optical signals traveling within an optical network) may be optically switched from a particular fiber to another fiber within the same optical cable. Alternatively, fiber switching may enable optically switching network traffic from a particular fiber, within a particular cable, to another fiber in another cable. For example, fiber switching within a single optical cable may include optically switching from a working fiber (e.g. an optical signal path comprised of an optical fiber that carries network traffic regularly in everyday optical network operations) to another working fiber and/or to a spare fiber (e.g., an optical fiber that is not carrying, or does not regularly carry, network traffic) within the same optical cable. In another example, fiber switching may also include optically switching from a working fiber within a particular optical cable to another working fiber and/or spare fiber in another optical cable.

Fiber switching network traffic from a working fiber to a spare fiber in a different optical cable may enable network traffic to temporarily travel through one or more spare fibers while the working fiber is undergoing repair, replacement and/or rerouting, such as to avoid a construction project (e.g., a road repair, bridge building, a utility project, etc.) that may involve a planned network cable cut or that may pose a risk of an inadvertent cable cut. Moreover, fiber switching network traffic from a working fiber to a spare fiber within another optical cable, may therefore reduce or eliminate the need to reroute network traffic, via a protection path, during optical cable maintenance events. Because the use of a protection path may be avoided, fiber switching may reduce network operating costs and safeguard against disruptions of network services to clients by reducing the number of network shut downs, maintaining optical network performance and reliability and/or preserving optical path diversity.

Fiber switching between working fibers and spare fibers within a particular optical cable may enable maintenance operations to be performed, such as fusion splice repairs to working fibers within the particular optical cable, while safeguarding client services, maintaining uninterrupted optical network traffic, and avoiding the risk and cost associated with establishing protection paths. Moreover, fiber switching may also enable dynamic rerouting of network traffic from one or more working paths (e.g., working cables that may include one or more working fibers) to one or more other working paths as a way to optimize signal path diversity and/or network performance and may be executed as a temporary, semi-permanent and/or permanent part of optical network operations, load balancing and/or network traffic management and optimization.

As used herein, the term "path" may include one or more optical fibers and/or one or more optical cables (e.g., that may include a bundle of one or more optical fibers) capable of carrying an optical signal or network traffic. A path may be in the form of a working path, a protection path, a temporary path, a maintenance path, etc. As used herein, the term "working path" may include one or more working fibers within a particular optical cable, and/or one or more optical cables that include one or more working fibers that regularly carry optical network traffic on a permanent or semi-permanent basis as part of everyday optical network operations. The term "protection path," as used herein, may include a signal path where network traffic, which normally travels over a working path, may be temporarily rerouted to another path (e.g., one or more optical fibers and/or one or more optical cables) due to a fault in the working path. Additionally, the term "spare fiber," as used herein, may include one or more fibers within one or more optical cables that do not regularly carry network traffic as part of everyday optical network operations and may be synonymous with the terms "dark fiber," "maintenance fiber," and/or "temporary fiber."

FIG. 1 is a block diagram of an exemplary optical network 100 in which systems and/or methods described herein may be implemented. Optical network 100 may include network devices 120-1 and 120-2 (referred to collectively as "network devices 120" and individually as "network device 120"), muxponder devices 130-1 and 130-2 (referred to collectively as "muxponder devices 130" and individually as "muxponder device 130"), fiber switch/amplifiers 140, west-east working fiber 150, west-east spare fiber 160, east-west working fiber 170, east-west spare fiber 180 and/or network management system 190. Optical network 100 may also include one or more transmission spans 110, which may be comprised of fiber switch/amplifier 140 at site one, fiber switch/amplifier 140 at site two, west-east working fiber 150, west-east spare fiber 160, east-west working fiber 170, and/or east-west spare fiber 180.

Optical network 100 may include network devices 120 connected to muxponder devices 130. Muxponder device 130-1 may be interconnected to muxponder device 130-2 by one or more optical cables comprised of west-east working fiber 150, west-east spare fiber 160, east-west working fiber 170 and/or east-west spare fiber 180. Optical network 100 may also include fiber switch/amplifier 140 interconnected with muxponder device 130-1 and/or muxponder device 130-2 and/or another fiber switch/amplifier 140 by one or more optical cables comprised of west-east working fiber 150, west-east spare fiber 160, east-west working fiber 170 and/or east-west spare fiber 180. Network management system 190 may be electrically and/or optically connected (not shown in FIG. 1) to network devices 120, muxponder devices 130, and/or fiber switch/amplifiers 140.

A single transmission span 110, network device 120-1, network device 120-2, muxponder device 130-1, muxponder device 130-2, fiber switch/amplifier 140 at site one, fiber switch/amplifier 140 at site two, west-east working fiber 150, west-east spare fiber 160, east-west working fiber 170 and/or east-west spare fiber 180 and network management system 190 are illustrated in FIG. 1 for simplicity. In practice, there may be additional or fewer transmission spans 110, network devices 120, muxponder devices 130, fiber switch/amplifiers 140, west-east working fibers 150, west-east spare fibers 160, east-west working fibers 170, east-west spare fibers 180 and/or network management systems 190. Additionally, in some implementations, one or more of the devices of optical network 100 may perform one or more functions described as being performed by another one or more of the devices of optical network 100. For example, functions attributable to fiber switch/amplifier 140 could be performed by muxponder device 130-1, muxponder device 130-2, and/or by another device, such as an optical fiber switch device and/or an optical amplifier device. Additionally, functions, described as being performed by network device 120-1, may be performed by muxponder device 130-1, and/or functions, described as being performed by network device 120-2, may be performed by muxponder device 130-2.

Optical network 100 may include one or more layers, such as a wavelength division multiplexing (WDM) layer (e.g., layer zero), an optical transport network (OTN) layer (e.g., layer one), an ethernet layer (e.g., layer two) and/or an internet protocol (IP) layer (e.g., layer three), etc. The WDM layer, OTN layer, ethernet layer and/or IP layer (e.g., layers 0-3, respectively) may provide particular functionalities pertinent to the operation, monitoring and control, transmission and/or signal content of optical network 100. For example, layer zero may include devices associated with optical signal generation and maintenance, such as muxponder device 130 and/or fiber switch/amplifier 140, or one or more components of muxponder device 130 and/or fiber switch/amplifier 140, such as lasers, multiplexers, demultiplexers and/or fiber switches, etc.

Layer one may include the OTN framework in which optical signals are transmitted over optical network 100 and may provide for signal routing, such as the establishment of one or more protection paths when a fault occurs. Additionally, layer one may provide optical channel provisioning, monitoring and control and/or optical signal maintenance and correction using a "digital wrapper" that provides preamble metadata for transport management (e.g., framing, supervisory functions for optical signal retiming, reshaping and regeneration) as well as postscript metadata for forward error correction (FEC) to reduce bit errors that may occur during transmission. Layer two may provide electrical transport for IP signals and/or other signals to and/or from the OTN layer and/or the IP layer. Layer three may include the IP layer that may integrate electrical functions, such as packet processing, routing, switching and/or multiplexing (electrical-to-optical signals) to produce optical signals that are provisioned on the optical network (e.g., via muxponder device 130) and may include devices, such as network device 120 and/or muxponder device 130.

Layers 0-3 of optical network 100, may collectively interact and/or communicate to perform functions and implementations described herein. Layers 0-3 may perform their respective functions utilizing one or more of the network devices described above (e.g., network device 120, muxponder device 130 and/or fiber switch/amplifier 140, etc.)

and/or additional network and/or optical devices. Also, in some implementations, one or more of the layers of optical network 100 may perform one or more functions described as being performed by another one or more of the layers of optical network 100. For example, functions attributable to the ethernet layer (e.g., layer 2) could be performed by the IP layer (e.g., layer three) and/or by the OTN layer (e.g. layer 1). Additionally, functions performed by the OTN layer, may be performed by the WDM layer (e.g., layer 0) and/or the ethernet layer. As discussed herein, functionalities and implementations of optical network 100 will be described in reference to a network and/or an optical device, or combinations of networks and/or optical devices (e.g., network device 120, muxponder device 130 and/or fiber switch/amplifier 140, etc.) that may perform a particular function or series of functions attributable to one or more of the layers of optical network 100. It should be understood that references to network devices associated with optical network 100 are not mutually exclusive of the layers associated with optical network 100 (as described immediately above) and that there may be significant overlap to one or more corresponding layers.

Network device 120 may include one or more devices that switch, route, process, send, receive and/or provide information in a manner similar to that described herein. Network devices 120 may communicate with muxponder device 130 to send and/or receive electrical signals containing information and/or data intended for operation and control of, and/or transmission over, optical network 100. Network device 120 may communicate with client networks and/or end user devices by processing and/or formatting signals, received from muxponder device 130, into protocols and/or standards that are understood and/or may be received by a client network and/or end user devices. Similarly, network device 120 may format and/or process signals received from client networks and/or end user devices for transmission to muxponder device 130 for transmission over optical network 100.

Muxponder device 130 may include one or more devices that can receive, convert, process, switch, amplify, modulate, demodulate, multiplex, demultiplex, and/or transmit electrical and/or optical signals in a manner described herein. Muxponder device 130 may perform optical multiplexing operations by receiving a number of electrical signals and processing them into a single, multiplexed optical signal with multiple component wavelengths for transmission over an optical network. For example, muxponder device 130-1 may receive a number of electrical signals from network device 120-1 and may up-convert the received electrical signals into a number of modulated optical signals, each at a distinct optical wavelength. The modulated optical signals may be multiplexed into a single outgoing multi-wavelength optical signal (e.g., comprised of the component wavelengths of the individual optical signals), using wavelength division multiplexing techniques, for transmission over optical network 100, via west-east working fiber 150, west-east spare fiber 160 and/or other west-east spare and/or working fibers.

Muxponder device 130 may also receive a multiplexed optical signal and may process the multiplexed optical signal into a number of modulated electrical signals for transmission over an electrical network. For example, muxponder device 130-1 may receive a multiplexed optical signal (e.g., containing many wavelengths) from fiber switch/amplifier 140, at site 1, via east-west working fiber 170, east-west spare fiber 180 and/or other east-west spare and/or working fibers within an optical cable. Muxponder device 130-1 may demultiplex the received optical signal (e.g., using wavelength division demultiplexing techniques) into a number of optical signals, each at distinct wavelengths. The number of optical signals may be down-converted to a number of modulated electrical signals for transmission to network device 120-1.

In one implementation, multiplexed optical signals from muxponder device 130-1, operating within optical network 100, may be transmitted over west-east working fiber 150 and/or west-east spare fiber 160 and received by muxponder device 130-2. Muxponder device 130-2 may demultiplex the received multiplexed optical signal and may distribute to a client network and/or an end user device, via network device 120-2. Similarly, multiplexed optical signals from muxponder device 130-2 may be transmitted over east-west working fiber 170 and/or east-west spare fiber 180 and received by muxponder device 130-1 where the received optical signal may be demultiplexed and distributed to a client network and/or an end user device, via network device 120-1.

Additionally, muxponder device 130 may perform optical amplification operations (e.g., amplify single and/or multi-wavelength optical signals), optical add-drop multiplexing operations (e.g., add and/or remove one or more signals from a multi-wavelength optical signal) and/or optical rerouting operations (e.g., reroute received optical signals to a protection path while maintenance is performed on a working path). To perform these operations, muxponder device 130 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM) to perform the optical rerouting and/or optical add-drop multiplexing/demultiplexing operations), and/or an optical demultiplexer (to perform the optical demultiplexing operations).

Fiber switch/amplifier 140 may include a device capable of increasing the strength and/or amplitude of a received optical signal, while maintaining the wavelength and/or bandwidth characteristics, information content and/or integrity of the optical signal. Additionally, fiber switch/amplifier 140 may include a device capable of rapidly switching optical signals between optical fibers in a manner such that network traffic (e.g., optical signals traveling within an optical cable) is not interrupted and/or network protection measures are not triggered (e.g., protection notification messaging, optical path rerouting, device shut down, etc.), such as when a fault and/or cable break occurs.

In one implementation, as shown in FIG. 1, one or more fiber switch/amplifiers 140 may be spaced intermittently along west-east working fiber 150, west-east spare fiber 160, east-west working fiber 170, east-west spare fiber 180 and/or other spare and/or working fibers to increase the signal strength sufficiently to enable the optical signal to travel without disruption between muxponder device 130-1 and muxponder device 130-2. The distance between adjacent fiber switch/amplifiers 140 within optical network 100 is defined as transmission span 110, as shown in FIG. 1, and there may be one or more transmission spans between muxponder 130-1 and muxponder 130-2. Furthermore, the length of different transmission spans may be the same or may differ.

Furthermore, fiber switch/amplifier 140 may support maintenance operations, such as fiber repairs (e.g., by fusion splicing), cable or fiber replacement, and/or cable or fiber rerouting around and/or away from obstacles or construction sites. For example, fiber switch/amplifier 140 may enable maintenance operations by optically switching network traffic between working fibers (e.g., west-east working fiber 150, east-west working fiber 170 and/or other working fibers) and spare fibers (e.g., west-east spare fiber 160, east-west spare fiber 180 and/or other spare fibers) contemporaneously with ongoing maintenance activities (e.g., repairing, replacing and/or rerouting cables or fibers) without interruptions to network traffic (e.g., a fault caused by a cable cut), establishing protection paths and/or triggering optical network protection measures within optical network 100 of FIG. 1.

West-east working fiber 150, west-east spare fiber 160, east-west working fiber 170 and/or east-west spare fiber 180 may be fiber optic lines (e.g., that provide a material medium for effective optical signal transmission) that interconnect muxponder device 130-1, muxponder device 130-2 and/or one or more fiber switch/amplifiers 140. West-east working fiber 150, west-east spare fiber 160, east-west working fiber 170 and/or east-west spare fiber 180 may receive optical signals from muxponder device 130 and may transmit optical signals to fiber switch/amplifier 140 and/or another muxponder device 130. In one implementation, there may be one or more of west-east working fiber 150, west-east spare fiber 160, east-west working fiber 170 and/or east-west spare fiber 180. In another implementation, west-east working fiber 150, west-east spare fiber 160, east-west working fiber 170, east-west spare fiber 180, and/or other working fibers and/or spare fibers may be combined within the same optical cable. In yet another implementation, an optical cable may carry only east-bound network traffic and, therefore, may include west-east working and/or west-east spare fibers (e.g., west-east working fiber 150, west-east spare fiber 160, and/or other west-east working fibers and/or west-east spare fibers), whereas east-west working and/or east-west spare fibers (e.g., east-west working fiber 170, east-west spare fiber 180, and/or other east-west working fibers and/or east-west spare fibers) may be included in another optical cable carrying west-bound traffic within network 100.

Network management system 190 may include a device, or collection of devices, that is capable of providing optical network monitoring and control. Network management system 190 may connect to network device 120, muxponder device 130 and/or fiber switch/amplifier 140. Network management system 190 may send notifications to network device 120, muxponder device 130 and/or fiber switch/amplifier 140 to control their operation (e.g., network management system 190 may send notifications directing one or more devices not to shut down, to shut down, to power up, to switch signals, not to switch signals and/or ignore signal interruptions, etc.). In one implementation, functions implemented by network management system 190 could be implemented by network device 120 and/or a different network device interconnected with the devices of optical network 100 (e.g., muxponder device 130, fiber switch/amplifier 140 and/or an add drop device).

FIG. 2A is a diagram of exemplary components of muxponder device 130-1, and muxponder device 130-2 may have similar components. As illustrated, muxponder device 130-1 may include a bank of one or more optical transmitters (Tx) 210, one or more wavelength division multiplexers 220, one or more wavelength division demultiplexers 230 and/or a bank of one or more optical receivers (Rx) 240. The bank of optical transmitters (Tx) 210 may be connected to one or more wavelength division multiplexers 220 and one or more wavelength division demultiplexers 230 may be connected to the bank of one or more optical receivers (Rx) 240. Two optical transmitters 210, one wavelength division multiplexer 220, one wavelength division demultiplexer 230 and two optical receivers 240 are illustrated in FIG. 2A for simplicity. In practice, there may be additional or fewer optical transmitters 210, wavelength division multiplexers 220, wavelength division demultiplexers 230 and/or optical receivers 240. Furthermore, in some implementations, one or more of the components of muxponder device 130 may perform one or more functions described as being performed by another one or more of the components of muxponder device 130. For example, one or more functions attributable to optical transmitter 210 could be performed by wavelength division multiplexer 220 while one or more functions attributable to optical receiver 240 could be performed by wavelength division demultiplexer 230.

Transmitter 210 may generally be regarded as an optical source, and may include any device that uses an electrical signal, such as an electrical signal received from network device 120 to modulate and generate an optical signal at a given wavelength. In one implementation, transmitter 210 may include a laser, which may generate and transmit an optical signal at a particular wavelength and/or with a particular bandwidth. For example, a bank of transmitters 210 may output multiple spatially-separated optical signals (e.g., at distinctly different wavelengths), to wavelength division multiplexer 220.

Wavelength division multiplexer 220 may include any device that merges and/or combines separate optical input signals at unambiguously distinguishable wavelengths into a single multi-wavelength optical output signal with a particular bandwidth. In one implementation, wavelength division multiplexer 220 may receive multiple spatially-separate optical signals from transmitters 210, and may merge the multiple optical signals to produce a multi-wavelength outgoing signal for transmission to fiber switch/amplifier 140 over west-east working fiber 150, west-east spare fiber 160, and/or other west-east spare fibers and/or west-east working fibers.

Wavelength division demultiplexer 230 may include any device that receives an incoming optical signal comprising multiple wavelengths, such as a wavelength division multiplexed optical signal received from fiber switch/amplifier 140 (e.g., via east-west working fiber 170, east-west spare fiber 180, and/or other east-west spare fibers and/or east-west working fibers) and spatially separates the component wavelengths of the received optical signal, such that there are a number of separate outgoing optical signals at each component wavelength. In one implementation, demultiplexer 230 may receive a multi-wavelength optical signal from fiber switch/amplifier 140 and may send a number of outgoing signals at component wavelengths to optical receivers 240.

Receiver 240 may include a device, such as a charged coupled device and/or photodetector, that receives an incoming optical signal and uses the incoming optical signal to generate an outgoing modulated electrical signal. In one implementation, a bank of optical receivers 240, as shown in FIG. 2A, may receive a number of incoming optical signals (e.g., from wavelength division demultiplexer 230) and may generate a number of corresponding modulated electrical signals (e.g., including video, text, data and/or telephonic signals) for transmission to network device 120.

FIG. 2B is a diagram of exemplary components of fiber switch/amplifier 140. As illustrated, fiber switch/amplifier 140 may include one or more amplifiers 250, fiber switches 260, optical signal test components 270 and/or signal test terminals 280. Amplifier 250 may be connected to fiber switch 260. Fiber switch 260 may be connected to optical signal test component 270 and may include one or more signal test terminals 280 connected to optical test signal component 270 and/or fiber switch 260. Two amplifiers 250, two optical signal test terminals 280, one fiber switch 260 and/or one optical signal test component 270 are illustrated in FIG. 2B for simplicity. In practice, there may be additional or fewer amplifiers 250, fiber switches 260, optical signal test components 270 and/or signal test terminals 280. Furthermore, in some implementations, one or more of the components of fiber switch/amplifier 140 may perform one or more functions described as being performed by another one or more of the components of fiber switch/amplifier 140. For example, functions attributable to fiber switch 260 could be performed by optical signal test component 270 and/or one or more amplifiers 250; similarly, functions attributable to optical signal test component 270 and/or signal test terminal 280, could be integrated and/or combined into a single component and/or could be performed by amplifier 250 and/or fiber switch 260.

Amplifier 250 may include a device that is capable of increasing the strength, and/or amplitude, of an incoming optical signal, while maintaining the wavelength and/or bandwidth characteristics, information content and/or integrity of the incoming optical signal. Amplifier 250 may be connected to west-east working and/or west-east spare fibers (e.g., west-east working fiber 150, west-east spare fiber 160, and/or other west-east working fibers and/or west-east spare fibers) to amplify signals traveling in one direction (e.g., east-bound) within optical network 100. Similarly, amplifier 250 may be connected to east-west working and/or east-west spare fibers (e.g., east-west working fiber 170, east-west spare fiber 180, other east-west working fibers and/or east-west spare fibers) to amplify signals traveling in the opposite and/or different direction (e.g., west-bound). Amplifier 250 may also be connected to fiber switch 260.

Fiber switch 260 may include a device that is capable of rapidly (e.g., faster than approximately 10 ms) switching optical signals between optical fibers (e.g., fiber switching) in a manner such that network traffic is not disrupted and/or network protection measures are not triggered (e.g., protection notification messaging, optical signal path rerouting, device shut downs, etc.) that may occur when there is a fault and/or break in an optical fiber or cable. Fiber switch 260 may receive optical signals from amplifier 250, optical signal test component 270 (via signal test terminal 280), an optical cable (e.g. west-east working fiber 150, west-east spare fiber 160, east-west working fiber 170, east-west spare fiber 180, and/or other spare and/or working fibers) and may rapidly switch optical signals between optical fibers (e.g., from east-west working fiber 170 to east-west spare fiber 180). Fiber switching, as used herein, may be further defined as optical switching between optical fibers, which may induce a minor optical perturbation and/or interruption of an optical signal of such short duration so as to be clearly distinguishable from a fault and/or to avoid triggering optical network protection measures (e.g., protection notification messaging, optical signal path rerouting, optical network device shut down, etc.). For example, service disruption and/or optical network protection measures within optical network 100 may be avoided by fiber switching of optical signals between fibers in less time (e.g. less than approximately 20 ms) than the fault threshold that may trigger network protection measures (e.g., an optical signal interruption that lasts at least 100 ms).

Optical signal test component 270 may include a device that is capable of generating and/or sending an optical test signal at a known wavelength, bandwidth and/or signal strength. Optical signal test component 270 may be connected to fiber switch 260 and may be capable of generating and/or sending an optical test signal (e.g. an optical signal from a laser device) such as an optical pulse, a series of optical pulses or a continuous optical signal, via signal test terminal 280. Optical signal test component 270 may also include a component capable of sensing and/or receiving optical test signals, including a photosensor and/or a photodetector. Optical signal test component 270 may be capable of receiving an incoming optical signal, via signal test terminal 280, and may use the incoming optical signal to generate an outgoing modulated electrical signal, such that the suitability of the received optical signal may be determined (e.g. signal strength, wavelength and/or bandwidth characteristics of the received optical test signal may be determined). For example, optical test component 270 may generate and send an optical test signal at a known wavelength and/or signal strength (e.g., power level) to an adjacent fiber switch/amplifier 140 via a transmission span (e.g. transmission span 110) of a given length bridged by west-east spare fiber 160 and/or another west-east fiber. Optical signal test component 270 of adjacent fiber switch/amplifier 140 may receive the optical test signal, at signal test terminal 280, where the signal strength, wavelength and/or bandwidth characteristics of the received optical signal may be used to determine whether west-east spare fiber 160 and/or the other west-east fiber is/are suitable for carrying network traffic signals.

FIG. 3 is a diagram of an exemplary transmission span 110 of optical network 100. Transmission span 110 may include amplification and/or switching site one and amplification and/or switching site two, where one or more fiber switch/amplifiers 140 may be located at site one and site two. Fiber switch/amplifier 140, at site one, and fiber switch/amplifier 140, at site two, may be interconnected by one or more optical cables that may include west-east working fiber 150, west-east spare fiber 160, east-west working fiber 170, east-west spare fiber 180, and/or other working fibers and/or spare fibers. The length of transmission span 110 (e.g. the distance between fiber switch/amplifier 140, at site one, and fiber switch amplifier 140, at site two) may be as much as approximately 160 kilometers. Furthermore, transmission span 110 may be located between muxponder device 130-1 and muxponder device 130-2 within optical network 100 and, in addition to transmission span 110, there may be one or more additional transmission spans between muxponder device 130-1 and muxponder device 130-2 that may be interconnected by one or more optical cables that may include west-east working fiber 150, west-east spare fiber 160, east-west working fiber 170, east-west spare fiber 180, and/or other working fibers and/or spare fibers.

In one implementation, as illustrated in FIG. 3, there may be a need to perform maintenance operations (e.g., repair, reroute and/or replace) on one or more optical cables or one or more optical fibers within an optical cable interconnecting site one fiber switch/amplifier 140 and site two fiber/switch amplifier 140. The site of the maintenance operations may be designated as the "fiber maintenance location," as shown in FIG. 3. The need to repair, reroute and/or replace an optical cable or one or more fibers within the optical cable between site one and site two of FIG. 3 (e.g., west-east working fiber 150, west-east spare fiber 160, east-west working fiber 170, east-west spare fiber 180, and/or other spare fibers and/or working fibers) may be due to a myriad of reasons, such as utility maintenance affecting an aerial optical cable, road construction that may require cutting a subterranean optical cable near the construction site and/or detection of a weak optical signal along the working path (e.g., attributable to reduced signal transmissivity due to age, damage and/or degradation of fiber optic material, and/or other reasons) that may cause a signal interruption.

Figure 4B:
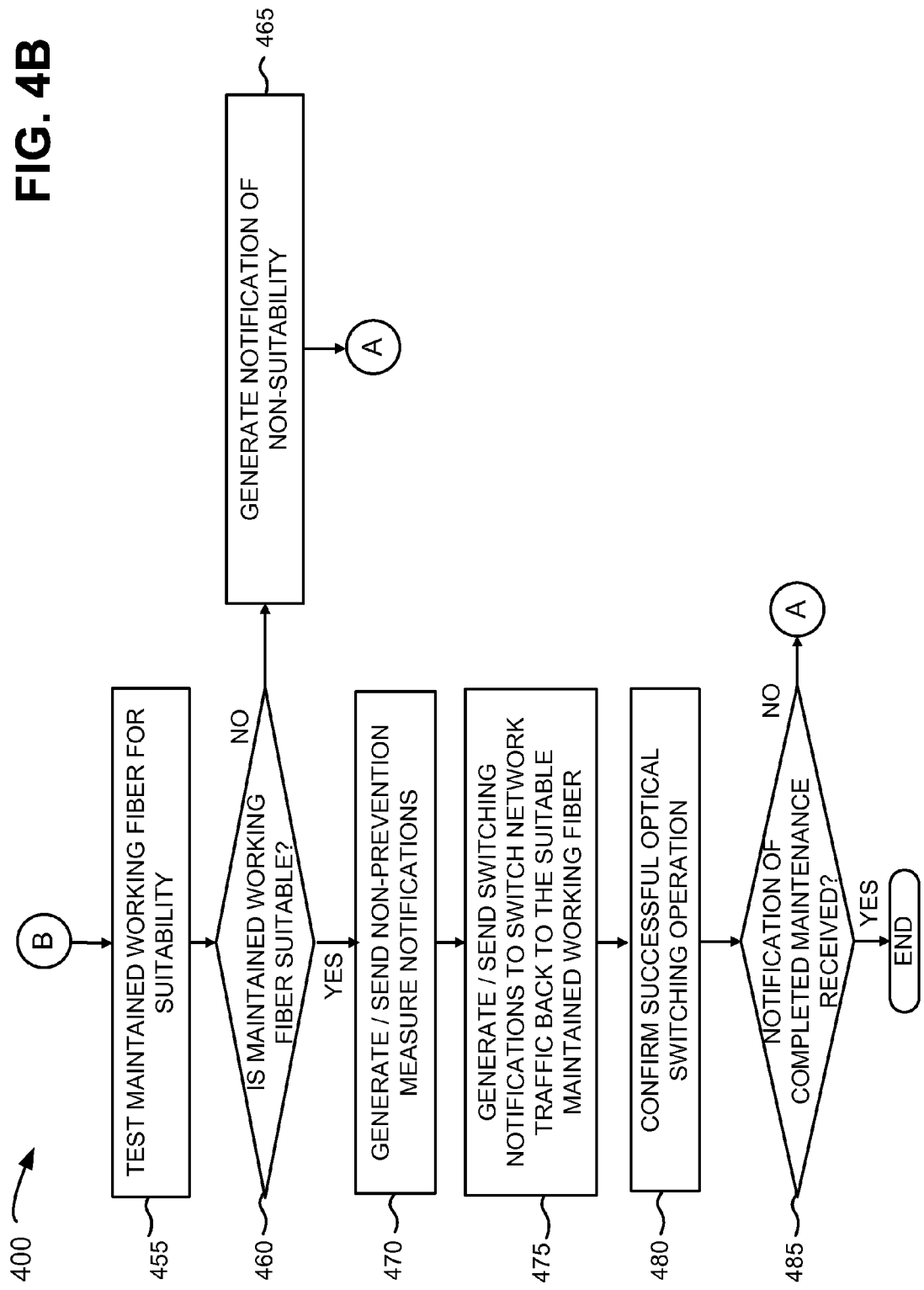
Figure 5:
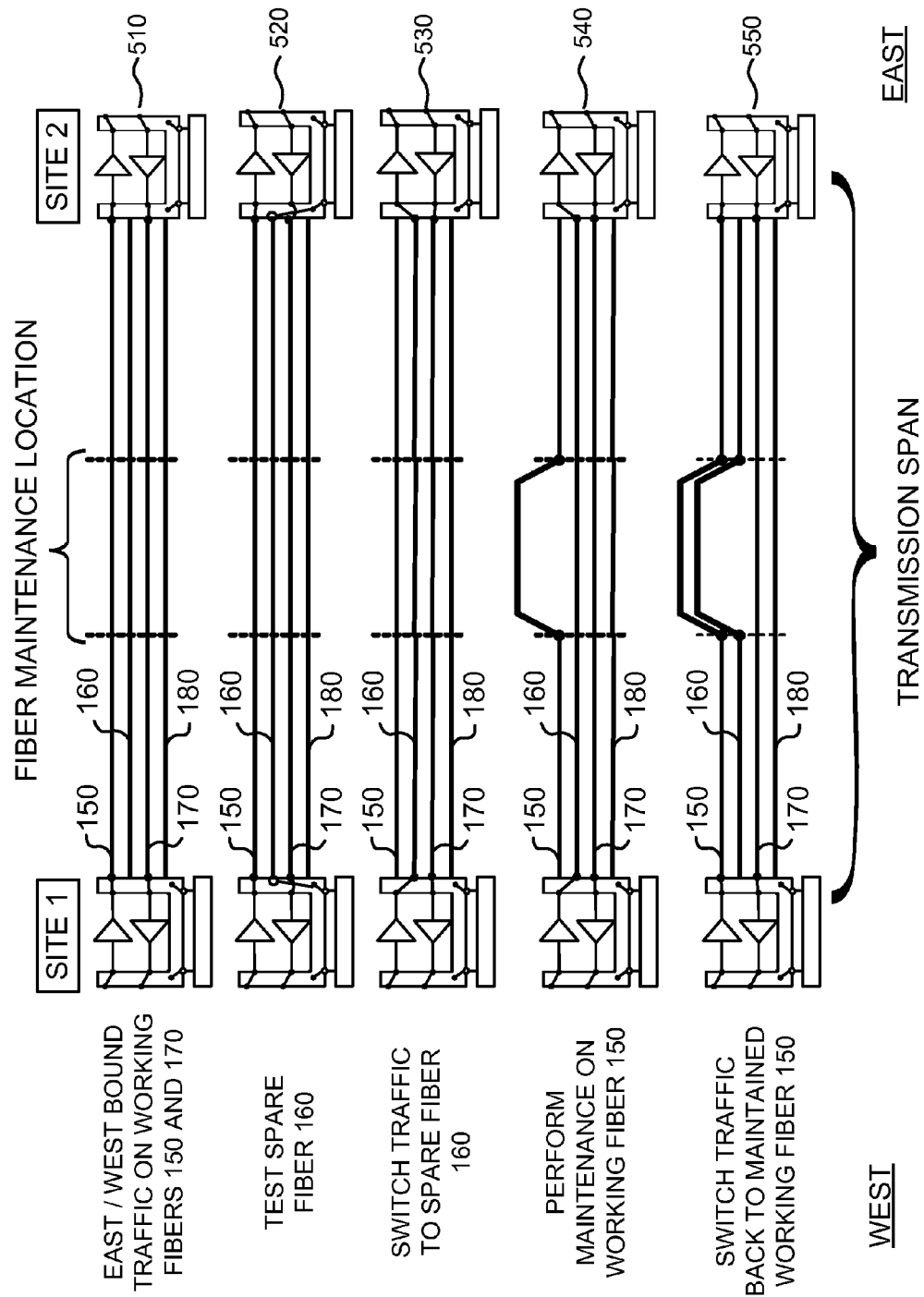
FIG. 5 is a diagram of exemplary fiber switching repair steps within a transmission span of the optical network of FIG. 1.

FIGS. 4A and 4B are flowcharts of an exemplary fiber switching maintenance process 400 for optical network 100. In one implementation, some or all of process 400 may be performed by one or more of the devices shown in FIG. 1. In another implementation, some or all of process 400 may be performed by one or more devices separate from, or in combination with, the devices shown in FIG. 1. FIG. 5 is a diagram illustrating certain portions of process 400. All or a portion of process 400 of FIGS. 4A and 4B will be discussed below with corresponding references to FIG. 5.

Process 400 may include receiving a maintenance notification (block 405) (FIG. 4A). For example, assume road repairs are planned at or near a portion of an optical cable carrying east-bound network traffic between site one and site two (e.g., an optical cable that may include west-east working fiber 150 and/or other west-east working fibers carrying east-bound traffic), as illustrated at 510, of FIG. 5, by the portion of the transmission span designated "fiber maintenance location." Assume further that the same road repairs are planned at or near a portion of an optical cable carrying west-bound network traffic between site one and site two (e.g., an optical cable including east-west working fiber 170 and/or other east-west working fibers carrying west-bound traffic), as illustrated at 510, of FIG. 5 (e.g., the designated fiber maintenance location).

A network maintenance team associated with optical network 100 may determine that it will perform maintenance (e.g., reroute, repair, and/or replace) on the optical cables carrying east-bound and/or west-bound network traffic and may temporarily reroute the optical cables around and away from the construction site to reduce the risk of a network interruption due to a cable cut at the construction site. The network maintenance team may send a maintenance notification to network management system 190. The maintenance notification may include information associated with the working path to be rerouted, such as working path optical cable (e.g., east-bound optical cable and/or west-bound optical cable) and/or the amplifier/switching sites (e.g., site one and site two) defining the transmission span where maintenance is planned (e.g., transmission span 110 between fiber switch/amplifier 140, at site one, and fiber switch/amplifier 140, at site two) between muxponder device 130-1 and muxponder device 130-2 of optical network 100.

Working fibers and/or surrogate fibers may be selected and a fiber selection notification may be received (block 410). For example, the network maintenance team associated with optical network 100 may decide to repair, reroute and/or replace one or more working fibers within the working path optical cable carrying east-bound network traffic. The maintenance team may identify a temporary working fiber (hereinafter referred to as a "surrogate fiber"), that may temporarily carry working path traffic (e.g., traffic that is being carried on west-east working fiber 150 and/or other west-east working fibers) while the working fibers carrying east-bound network traffic are being rerouted around and away from the construction site. The network maintenance team may send a fiber selection notification to network management system 190. The notification may include information identifying the particular working fiber to be rerouted and/or replaced (e.g., west-east working fiber 150 and/or other west-east working fibers) and/or one or more surrogate fibers that are not currently carrying traffic (e.g., west-east spare fiber 160 and/or other west-east spare fibers).

A surrogate optical fiber may be tested for suitability (block 415). For example, network management system 190 may receive a maintenance notification and/or a fiber selection notification and, as illustrated at 520, of FIG. 5, may direct fiber switch/amplifier 140, at site one of transmission span 110, to transmit an optical test signal to fiber switch/amplifier 140 at site two, via the selected surrogate fiber as identified in the fiber selection notification (e.g. west-east spare fiber 160 and/or other west-east spare fibers). The optical test signal may be used to determine whether the selected surrogate fiber is suitable to temporarily carry all or a portion of working path network traffic (e.g., network traffic traveling on west-east working fiber 150). The transmitted optical test signal may include a particular wavelength, bandwidth and/or power level.

If the selected surrogate fiber is not suitable (block 420—NO), then a notification of non-suitability may be generated (block 425), and a new surrogate fiber may be selected (block 410). If, however, the selected surrogate fiber is suitable (block 420—YES), then non-prevention measure notifications may be generated and sent (block 430). For example, as illustrated at 520, of FIG. 5, fiber switch/amplifier 140, at site two, may receive an optical test signal from fiber switch/amplifier 140, at site one, via the selected surrogate fiber (e.g., west-east spare fiber 160 and/or other west-east spare fibers). Network management system 190, may compare the received optical test signal power level with that of the transmitted optical test signal to determine whether the received power level is acceptable, while taking into account expected losses and attenuation for a known length of transmission span 110.

Furthermore, network management system 190 may compare the wavelength and/or bandwidth characteristics of the received optical test signal with that of the transmitted optical test signal (e.g., the optical test signal generated by fiber switch/amplifier 140, at site one) to determine whether the received wavelength and/or bandwidth are sufficiently similar (e.g., taking into consideration expected normal signal attenuation, intermodal dispersion, etc. at a known signal wavelength) over a known transmission length (e.g., length of transmission span 110). If network management system 190 determines that the power level of the received optical test signal is not acceptable (e.g., the optical test signal amplitude is below a minimum signal power threshold established for optical network 100 and/or fiber switch/amplifier 140) and/or the wavelength and/or bandwidth of the received optical test signal are not sufficiently similar, then the network management system 190 may generate a notification of non-suitability and a new surrogate fiber may be identified.

If, however, the received optical test signal power level is deemed acceptable (e.g., the received optical test signal amplitude is above the minimum signal power threshold for optical network 100 and/or fiber switch/amplifier 140) and/or the wavelength and bandwidth characteristics of the received optical test signal are deemed to be sufficiently similar to the transmitted optical test signal (e.g., considering expected normal signal attenuation, intermodal dispersion, etc. at a known signal wavelength and/or a give transmission length), then network management system 190 may generate non-prevention measure notifications for transmission to network devices 120, muxponder devices 130 and/or fiber switch/amplifiers 140.

For example, network management system 190 may send one or more non-prevention measure notifications to muxponder devices 130 and/or fiber switch/amplifiers 140 directing that an optical interruption caused by the optical switching operation from the working fiber to the suitable surrogate fiber (e.g., fiber switch from west-east working fiber 150 to west-east spare fiber 160) be ignored and/or that protection measures not be implemented. Muxponder devices 130 may receive non-prevention measure notifications directing that protection measures not be implemented and muxponder devices 130 may not execute protection measures, such as shutting down transmitters and/or multiplexers (e.g. transmitters 210 and/or wavelength division multiplexer 220, etc.) associated with muxponder devices 130. Similarly, fiber switch/amplifiers 140 may receive non-prevention measure notifications directing that protection measures not be implemented and fiber switch/amplifiers 140 may not execute protection measures, such as shutting down amplifiers associated with fiber switch/amplifiers 140 (e.g., amplifier 250).

In another example, network management system 190 may send non-prevention measure notifications to network devices 120 and/or muxponder devices 130 directing that the optical interruption caused by the fiber switch from the working fiber to the suitable surrogate fiber (e.g., fiber switch from west-east working fiber 150 to west-east spare fiber 160) be ignored and/or that protection measures not be implemented. Network devices 120 and/or muxponder devices 130 may receive the notifications to ignore the optical interruption and/or that protection measures not be implemented and network devices 120 and/or muxponder devices 130 may not execute protection measures, such as reporting that a working path is down (e.g., that an optical cable and/or working fiber is cut or otherwise disabled); taking measures to reroute network traffic; and/or establishing an alternate signal path (e.g., a protection path).

Switching notifications to switch network traffic to the suitable surrogate fiber may be generated and sent (block 435). For example, having sent non-prevention measure notifications to devices associated with optical network 100, network management system 190 may send switching notifications directing fiber switch/amplifiers 140, at site one and site two, to optically switch from the working fiber to the suitable surrogate fiber. The switching notifications may include information associated with the timing of the switch, such as a specified date and time (e.g., hours, minutes, seconds, etc.), within a specified period of time after the switching notification is sent by network management system 190, or within a specified period of time after the notification is received by fiber switch/amplifiers 140; information identifying the working fiber from which network traffic is being switched (e.g., west-east working fiber 150, the fiber on output port 1, the fiber on input port 8, or some other identification of the working fiber); information identifying the suitable surrogate fiber that network traffic is being switched to (e.g., west-east spare fiber 160, the fiber on output port 28, the fiber on input port 32, or some other identification of the spare fiber); and/or other information that may facilitate a fiber switching operation (e.g., information identifying whether a particular fiber switch/amplifier 140 is the downstream device or the upstream device with regard to the fiber switching operation).

Fiber switch/amplifier 140, at site one, may receive the switching notification and may optically switch network traffic from the working fiber to the suitable surrogate fiber. For example, as illustrated at 530, of FIG. 5, fiber switch/amplifier 140, at site one, may receive the switching notification from network management system 190 and, at a time specified by the switching notification (e.g., at a specified time of day, at the instant the switching notification is sent/received, or within a specified time period after switching notification is sent/received, etc.), may optically switch east-bound network traffic from the working fiber to the suitable surrogate fiber (e.g., fiber switch from west-east working fiber 150 to west-east spare fiber 160), within a period of approximately 10 ms or less as measured from the time specified by the switching notification.

The fiber switching operation, performed by fiber switch/amplifier 140, at site two, may differ from the fiber switching operation, performed by fiber switch/amplifier 140, at site one. For example, fiber switch/amplifier 140, at site two, may receive the switching notification and may enter listening mode, at a time specified by the switching notification (e.g., at a specified time of day, at the instant the switching notification is received, or within a specified time period after switching notification is sent/received, etc.). While in listening mode, fiber switch amplifier 140, at site two, may monitor the east-bound network traffic received from fiber switch/amplifier 140, at site one, via the working fiber (e.g., west-east working fiber 150). Fiber switch/amplifier 140, at site two, may optically switch east-bound network traffic, as illustrated at 530, of FIG. 5, from the working fiber to the suitable surrogate fiber (e.g., fiber switch from west-east working fiber 150 to west-east spare fiber 160), when the optical signal associated with the east-bound network traffic received from the working fiber ceases to be received (e.g., fiber switch/amplifier 140, at site two, detects a loss of signal on west-east working fiber 150). The optical signal associated with the east-bound network traffic may be deemed to have ceased when light photons from the optical signal associated with east-bound network traffic are no longer detected by fiber switch/amplifier 140, at site two.

If, however, fiber switch/amplifier 140, at site two, continues to receive an optical signal from the working fiber (e.g., fiber switch/amplifier 140, at site two, continues to detect photons from west-east working fiber 150) for a period of time that exceeds approximately 20 ms, as measured from the time specified by the switching notification, then fiber switch/amplifier 140, at site two, may not perform the optical switching operation. In this case, fiber switch/amplifier 140, at site two, may not perform the optical switching operation because the cessation of the optical signal being received on the working fiber may not have occurred (e.g., because fiber switch/amplifier 140, at site one, may not have performed the switching operation) and network traffic may continue to travel uninterrupted within the working fiber.

If an optical interruption (caused by the fiber switching) exceeds approximately 20 ms (block 440—YES), then a fault may have occurred and protection measures may be executed (block 450). For example, if an optical interruption exceeds approximately 20 ms as measured from the time specified by the switching notification to the time that the fiber switching, by fiber switch/amplifiers 140, completes, network devices 120, muxponder devices 130, and/or fiber switch amplifiers 140 may initiate prevention measures and process 400 may end. Network devices 120 may execute protection measures, such as reporting that a working path is down (e.g., that an optical cable and/or working fiber is cut or otherwise disabled); taking measures to reroute network traffic; and/or establishing an alternate signal path (e.g., a protection path). Muxponder devices 130 may execute protection measures, such as shutting down transmitters and/or multiplexers (e.g. transmitters 210 and/or wavelength division multiplexer 220, etc.) associated with muxponder devices 130. Fiber switch/amplifiers 140 may execute protection measures, such as shutting down amplifiers associated with fiber switch/amplifiers 140 (e.g., amplifier 250).

If, however, the optical interruption does not exceed approximately 20 ms (block 440—NO), then a notification of completed maintenance may be received (block 445) and the maintained working fiber may be tested for suitability (block 455) (FIG. 4B). For example, network management system 190 may receive a notification of completed maintenance from the maintenance team associated with optical network 100, indicating that maintenance on the working fiber (e.g., west-east working fiber 150) has been completed (e.g., repaired, replaced and/or rerouted around the construction site), as illustrated at 540 of FIG. 5, and that the maintained working fiber may be tested for suitability to carry network traffic associated with network 100. In a manner similar to that discussed above (at block 415 of FIG. 4A), network management system 190 may test the suitability of the maintained working fiber (e.g., repaired, replaced and/or rerouted west-east working fiber 150 around the construction site) by directing fiber switch/amplifier 140, at site one, to send an optical test signal to fiber switch/amplifier 140, at site two, via the maintained working fiber.

If the maintained working fiber is not suitable (block 460—NO), then a notification of non-suitability may be sent (block 465) and a new working fiber may be selected (block 410) (FIG. 4A). If, however, the maintained working fiber is suitable (block 460—YES), then non-prevention measure notifications may be generated and sent (block 470). For example, in a manner similar to that discussed above (at block 420 of FIG. 4A), if network management system 190 determines that the power level of the received optical test signal (e.g., the signal received by fiber switch/amplifier 140, at site two) is acceptable (e.g., above the minimum signal power threshold for optical network 100 and/or fiber switch/amplifier 140) and/or wavelength and bandwidth characteristics of the received optical test signal are sufficiently similar to the optical test signal sent by fiber switch/amplifier 140, at site one (e.g., considering expected normal signal attenuation, intermodal dispersion, etc. at a known signal wavelength and/or a give transmission length), then network management system 190 may generate non-prevention measure notifications for transmission to muxponder devices 130 and/or fiber switch/amplifiers 140.

For example, in a manner similar to that discussed above (at block 430 of FIG. 4A), network management system 190 may send one or more non-prevention measure notifications to muxponder devices 130 and/or fiber switch/amplifiers 140 directing that an optical interruption caused by the optical switching operation from the suitable surrogate fiber to the suitable maintained working fiber (e.g., fiber switch from west-east spare fiber 160 to west-east working fiber 150) be ignored and/or that protection measures not be implemented. Muxponder devices 130 may receive non-prevention measure notifications directing that protection measures not be implemented and muxponder devices 130 may not execute protection measures, such as shutting down transmitters and/or multiplexers (e.g. transmitters 210 and/or wavelength division multiplexer 220) associated with muxponder devices 130. Similarly, fiber switch/amplifiers 140 may receive non-prevention measure notifications directing that protection measures not be implemented and fiber switch/amplifiers 140 may not execute protection measures, such as shutting down amplifiers associated with fiber switch/amplifiers 140 (e.g., amplifier 250).

In another example, network management system 190 may send non-prevention measure notifications to network devices 120 and/or muxponder devices 130 directing that the optical interruption caused by the optical switching operations from the suitable surrogate fiber to the suitable maintained working fiber (e.g., fiber switch from west-east spare fiber 160 to west-east spare fiber 150) be ignored and/or that protection measures not be implemented. Network devices 120 and/or muxponder devices 130 may received notifications to ignore the optical interruption and/or that protection measures not be implemented and network device 120 and/or muxponder 130 may not execute protection measures, such as reporting that a working path is down (e.g., that an optical cable and/or working fiber is cut or otherwise disabled); taking measures to reroute network traffic; and/or establishing an alternate signal path (e.g., a protection path).

Switching notifications to switch network traffic to the suitable maintained working fiber may be generated and sent (block 475). For example, having sent non-prevention measure notifications to devices associated with optical network 100, network management system 190 may send switching notifications, in a manner similar to that described above (at block 435 of FIG. 4A) directing fiber switch/amplifiers 140, at site one and site two, to optically switch from the suitable surrogate fiber to the suitable maintained working fiber (e.g., repaired, replaced and/or rerouted west-east working fiber 150 around the construction site). Fiber switch/amplifier 140, at site one and site two, may receive the switching notification and may optically switch network traffic from the suitable surrogate fiber to the suitable maintained working fiber in a manner similar to that described above.

The success of the optical switching operation may be confirmed (block 480). For example, fiber switch/amplifiers 140, at sites one and two, may or may not successfully perform the optical switching operation from the suitable surrogate fiber to the suitable maintenance working fiber, and appropriate actions may be performed in a manner similar to that discussed above with regard to blocks 435-450 in FIG. 4A.

The above blocks may be repeated for other working/surrogate fibers until maintenance on all of the fibers is complete. If maintenance on all fibers is complete (block 485—YES), then process 400 may end. If, however, maintenance on all fibers is not complete (block 485—NO), then a new working fiber and/or surrogate fiber may be selected and a fiber selection notification may be received (block 410) (FIG. 4A). For example, if there are remaining fibers to be repaired, such as within the east-bound optical cable (e.g., that may include west-east working fiber 150, west-east spare fiber 160 and/or other west-east working and/or spare fibers) and/or the west-bound optical cable (e.g., that may include east-west working fiber 170, east-west spare fiber 180 and/or other east-west working and/or spare fibers) associated with transmission span 110, then the network maintenance team, associated with optical network 100, may send a fiber selection notification to the network management system 190 in a manner similar to that discussed above with regard to block 410. The fiber switching maintenance process 400 of FIGS. 4A and 4B may then continue as described above until maintenance on all fibers is complete.

Figure 6:
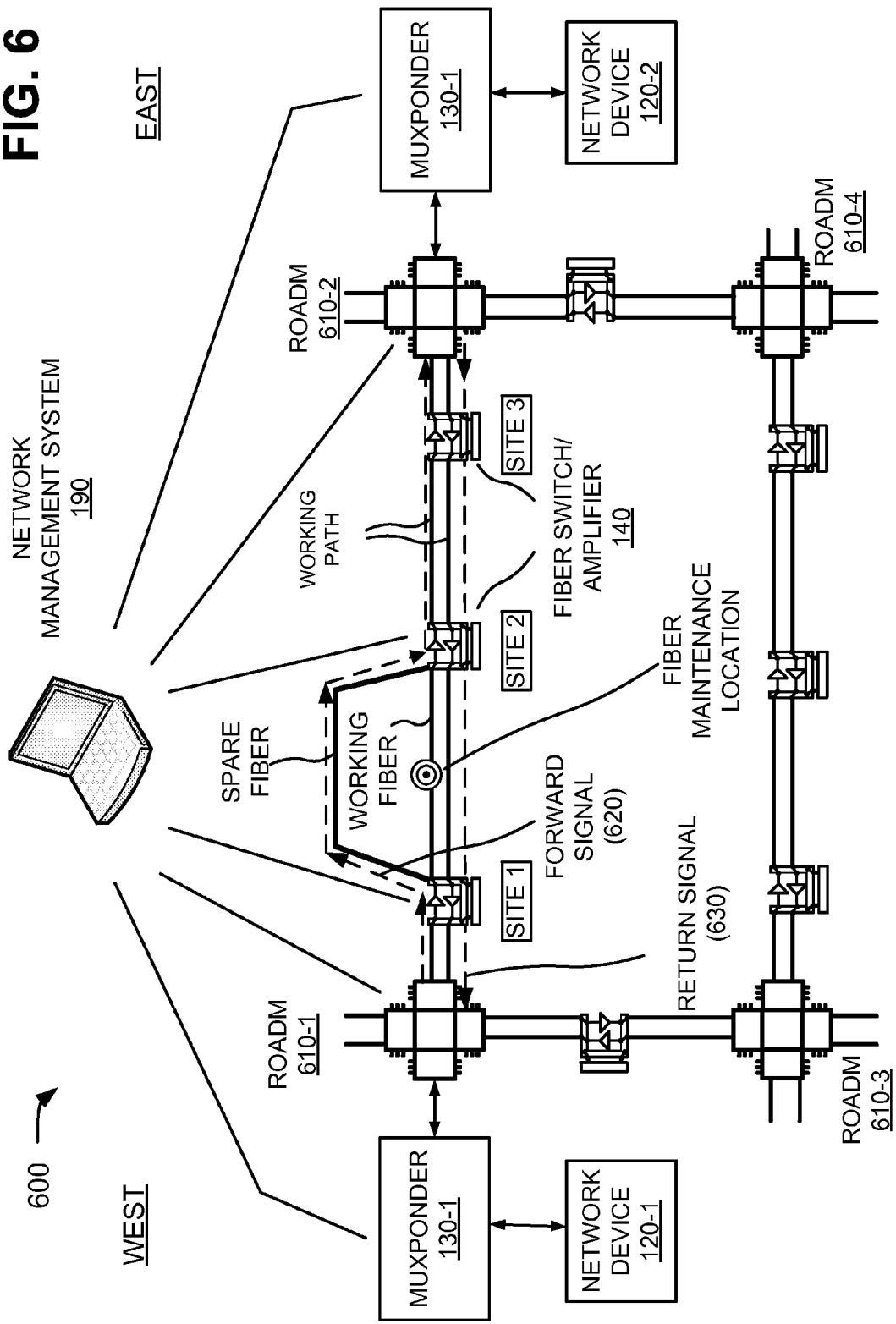
FIG. 6 is a diagram of an exemplary optical network in which fiber switching may be performed.

FIG. 6 is an exemplary optical network 600 in which fiber switching may be performed. As shown in FIG. 6, optical network 600 may include network devices 120-1 and 120-2, muxponder devices 130-1 and 130-2, fiber switch amplifiers 140, network management system 190, and reconfigurable optical add/drop multiplexer (ROADM) device 610-1 through 610-4. A ROADM device is a form of an optical add-drop multiplexer.

As shown in FIG. 6, fiber switch/amplifier 140 may be located at site one, site two and/or site three along the working path between muxponder device 130-1 and muxponder device 130-2 and may be interconnected by one or more optical cables that may include an east-bound working path (e.g., comprising a west-east working fiber, a west-east spare fiber and/or other west-east working and/or west-east spare fibers) and/or a west-bound working path (e.g., comprising an east-west working fiber, an east-west spare fiber and/or other east-west working and/or east-west spare fibers). Fiber switch/amplifier 140 may generally be included at the same and/or different sites as optical amplifier devices of optical network 100 (FIG. 1).

In one implementation within exemplary optical network 600, forward signal 620 may travel from muxponder device 130-1 to muxponder device 130-2, via ROADM 610-1 and ROADM 610-2, by the west-east working path. Similarly, return signal 630 may travel from muxponder device 130-2 to muxponder device 130-1, via ROADM 610-2 and ROADM 610-1, by the east-west working path.

Assume that a weak forward signal 620 is observed at site two (e.g., by the network management system 190), and that a maintenance event is scheduled to repair and/or replace the west-east working path between site one and site two. A fiber switching maintenance technique may be utilized to repair the west-east working path (e.g., the west-east working fiber). For example, the west-east working fiber may be repaired utilizing west-east spare fiber as a surrogate fiber to temporarily handle working path network traffic in a manner similar to that discussed above with respect to process 400 of FIGS. 4A and 4B. Consequently, network traffic may be switched from the west-east working fiber to the west-east spare fiber using fiber switch/amplifiers 140 and without the need to route the network traffic on a protection path, as done with existing optical network.

Utilizing a protection path to conduct maintenance operations may introduce unnecessary impacts on optical network operations, potentially interrupting optical network's delivery of client services and increasing operational cost. For example, utilizing a protection path, particularly during planned maintenance operations, may introduce constraints into the optical network that may affect performance, such as loss of optical path diversity (e.g., loss of link diversity and/or node diversity) due to the reduction in the number of available signal paths available to forward signal 620, which may also reduce available bandwidth for forward signal 620 and/or other network traffic. Furthermore, optical network devices along the west-east working path between muxponder device 130-1 and muxponder device 130-2 may be shut down, which may increase bandwidth demand in other portions of the optical network and may reduce available signal paths available to forward signal 620 and/or other optical signals in need of network resources (e.g., optical paths and/or bandwidth) to reach intended destinations (e.g., client networks and/or end user devices).

Additionally, normal fiber maintenance operations using protection paths may be both costly and disruptive to network operations due to the need to schedule maintenance events well in advance to minimize impact on network services (e.g., due to shut downs on portions of the optical network), to coordinate potential interruption of network services to clients, and/or to synchronize maintenance crew schedules.

Additionally, utilization of protection paths may also increase the likelihood of dual failures and/or reduced optical network reliability and/or performance. For example, the protection path may introduce a number of new operations on forward signal 620, such as rerouting events that may involve optical signal processing (e.g., optical switching, wavelength division multiplexing, wave division demultiplexing, optical amplification, etc.) of forward signal 620 as well as additional optical amplification events while in transit along the protection path. The additional operations performed on forward signal 620 as a result of the protection path may consume optical network resources and bandwidth and may introduce additional risks of disruption to forward signal 620.

Implementations, described herein, may introduce switch devices into an optical network that permit an optical fiber or cable to be switched to a spare fiber or cable, during maintenance operations, without the need to use a protection path, thereby avoiding the pitfalls of using protection paths.

The foregoing description provides illustration and description, but is not intended to be exhaustive or to limit the invention to the precise form disclosed. Modifications and variations are possible in light of the above teachings or may be acquired from practice of the invention.

For example, while a series of blocks have been described with regard to FIGS. 4A and 4B, the order of the blocks may be changed in other implementations. Also, non-dependent blocks may be performed in parallel.

Furthermore, while the embodiments disclosed have been presented as generally suitable for use in an optical network, the system and methods disclosed herein are suitable for any fiber optic network, fiber network, fiber line, or link that includes one or more transmission spans, amplifier spans or hops.

Also, fiber switch/amplifier devices 140 have been described as performing fiber switching operations. In another implementation, these fiber switching operations may be performed by a fiber switch device that does not include amplification capability. For example, fiber switch devices may be located at various points within a network, possibly irrespective of where the amplification devices are located. These fiber switch devices may perform the fiber switching operation described herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a plurality of switching devices,
   a first switching device, of the plurality of switching devices, being connected to a second switching device, of the plurality of switching devices, by a plurality of signal paths, and
   the first switching device being to:
      receive, from another device, an instruction to switch from a first path, of the plurality of signal paths, to a second path, of the plurality of signal paths,
      the first path being different from the second path, and
      the instruction including timing information, and
      perform, based on the instruction and at a time specified by the timing information, a first switching operation to connect the first path, at an input of the first switching device, to the second path, at an output of the first switching device; and
   the second switching device being to:
      receive, from the other device, the instruction to switch from the first path to the second path,
      detect a loss of signal on the first path as a result of the first switching operation performed by the first switching device, and
      perform, based on the loss of signal, a second switching operation to connect the first path, at an output of the second switching device, to the second path, at an input of the second switching device.

2. The system of claim 1,
where the first switching device is further to:
   connect the second path to a first test device before performing the first switching operation,
   receive a test signal from the first test device, and
   transmit the test signal on the second path; and where the second switching device is further to:
connect the second path to a second test device before performing the second switching operation,
receive the test signal on the second path, and
provide the test signal to the second test device to determine a suitability of the second path to handle signals from the first path.

3. The system of claim 2, where the first switching device and the second switching device perform the first switching operation and the second switching operation, respectively, only after the second path is determined to be suitable to handle the signals from the first path.

4. The system of claim 2,
where the system further includes the other device, and
where the other device is to:
receive, from the second test device, information associated with the test signal,
determine, based on the information associated with the test signal, that the second path is suitable to handle the signals from the first path, and
provide the instruction to the first switching device and the second switching device after determining that the second path is suitable to handle the signals from the first path.

5. The system of claim 1,
where the system further includes the other device, and
where the other device is to:
receive a notification associated with the first path,
generate the instruction based on the notification, and
provide the instruction to the first switching device and the second switching device.

6. The system of claim 1,
where the system further includes the other device, and
where the other device is to:
send a notification to the first network device and the second network device,
the notification instructing the first network device and the second network device to ignore a loss of signal while the first switching operation and the second switching operation are performed.

7. The system of claim 6, where the second network device is further to:
determine that the first switching operation and the second switching operation collectively are taking more than a particular amount of time,
initiate a protection measure after determining that the first switching operation and the second switching operation are collectively taking more than the particular amount of time.

8. The system of claim 1, where the first switching operation and the second switching operation are both completed in less than 20 ms from the time specified by the timing information.

9. The system of claim 1, where the second switching operation is completed in less than 10 ms after detecting the loss of signal on the first path.

10. The system of claim 1, where the first switching operation is completed in less than 10 ms from the time specified by the timing information.

11. The system of claim 1,
where the first switching device is further to:
receive, after a maintenance operation is performed on the first path to form a maintained first path, another instruction to switch from the second path to the maintained first path, and
perform, based on the other instruction, a third switching operation to connect the first path, at the input of the first switching device, to the maintained first path, at the output of the first switching device; and
where the second device is further to:
receive the other instruction to switch from the second path to the maintained first path,
detect a loss of signal on the second path as a result of the third switching operation performed by the first switching device, and
perform, based on the loss of signal, a fourth switching operation to connect the first path, at the output of the second switching device, to the maintained first path, at the input of the second switching device.

12. A method comprising:
receiving, by a first switching device of a plurality of switching devices and from another device, an instruction to switch from a first path, of a plurality of signal paths, to a second path, of the plurality of signal paths, the instruction including timing information;
performing, by the first switching device, and based on the instruction, a first switching operation, at a time specified by the timing information, to connect the first path, at an input of the first switching device, to the second path, at an output of the first switching device;
receiving, by a second switching device of the plurality of switching devices and from the other device, the instruction to switch from the first path to the second path,
the second switching device being connected to the first switching device by the plurality of optical signal paths; and
detecting, by the second switching device, a loss of signal from the first switching device, on the first path, as a result of the first switching operation,
performing, by the second switching device and based on the loss of signal on the first path, a second switching operation to connect the first path, at an output of the second switching device, to the second path, at an input to the second switching device.

13. The method of claim 12, where the first switching operation is completed in less than 10 ms from the time specified by the timing information.

14. The method of claim 12, where the second switching operation is completed in less than 10 ms from a later time when the loss of signal is detected by the second switching device.

15. The method of claim 12, where the first switching operation and the second switching operation are completed in less than 20 ms from the time specified by the timing information.

16. The method of claim 12, further comprising:
connecting, by the first switching device, to a first test device before performing the first switching operation;
receiving, by the first switching device and from the first test device, a test signal;
transmitting, by the first switching device, the test signal to the second switching device over the second path;
connecting, by the second switching device, to a second test device before performing the second switching operation;
receiving, by the second switching device and from the first switching device, the test signal via the second path; and
sending, by the second switching device and to the second test device, the test signal to determine a suitability of the second path to carry signals from the first path.

17. The method of claim 12, where a maintenance operation is performed on the first path to form a maintained first path, of the plurality of signal paths, the method further comprising:
receiving, by the first switching device and after a maintenance operation is performed on the first path to form a maintained first path, another instruction to switch from the second path to the maintained first path;

performing, by the first switching device and based on the other instruction, a third switching operation to connect the first path, at the input of the first switching device, to the maintained first path, at the output of the first switching device;

receiving, by the second switching device, the other instruction to switch from the second path to the maintained first path; and detecting, by the second switching device, another loss of signal from the first switching device, on the second path, as a result of the third switching operation; and performing, by the second switching device and based on the other loss of signal on the second path, a fourth switching operation to connect the first path, at the output of the second switching device, to the maintained first path, at the input to the second switching device.

18. A device comprising:
a switch to:
   receive, from another device, an instruction to switch from a working path, of a plurality of paths carrying optical network traffic, to a maintenance path, of the plurality of paths,
   the instruction including timing information, and
   the working path including one or more working fibers that carry optical network traffic carrying optical network traffic,
   determine, based on the instruction, that the device is a downstream switching device, and
   perform, after determining that the device is the downstream switching device and at a time specified by the timing information, a first switching operation to connect the working path, at an input of the switch, to the maintenance path, at an output of the switch.

19. The device of claim 18,
where the switch is further to:
   connect the maintenance path to a test device before performing the first switching operation,
   receive a test signal from the test device, and
   output the test signal on the maintenance path
   to determine a suitability of the maintenance path to handle the optical network traffic.

20. The device of claim 18, where the first switching operation is completed within 10 ms from the time specified by the timing information.

* * * * *